Nov. 23, 1965  F. E. GOLDING  3,219,959
STRAIN GAGE RANGE EXTENSION
Filed April 29, 1963
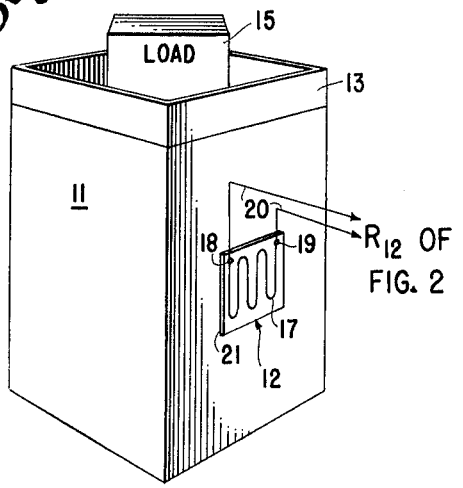
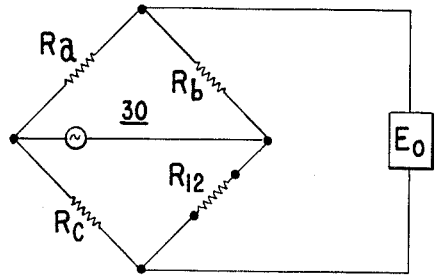
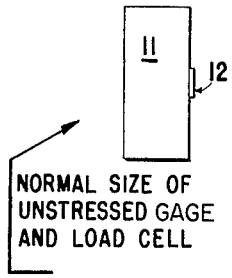
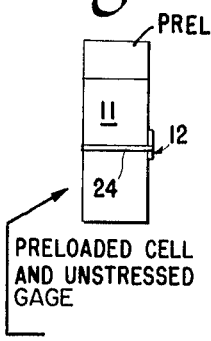
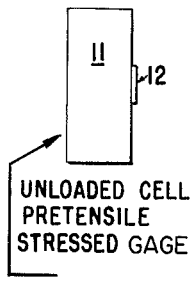
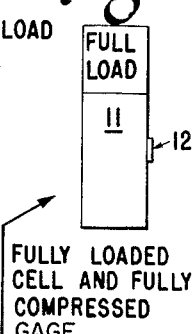
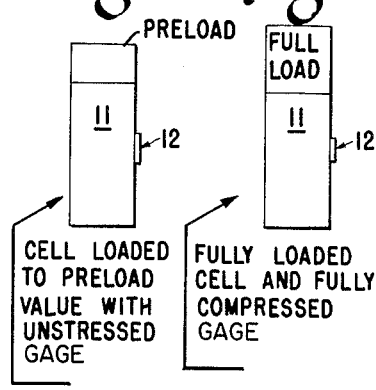
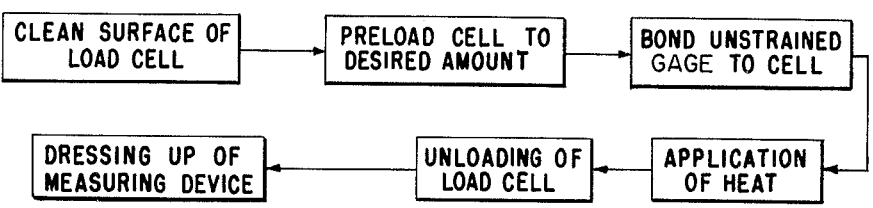
INVENTOR.
FRANK E. GOLDING
BY
Marshall, Wilson & Yeasting
~attorneys~

United States Patent Office 3,219,959
Patented Nov. 23, 1965

3,219,959
STRAIN GAGE RANGE EXTENSION
Frank E. Golding, Toledo, Ohio, assignor to Toledo Scale Corporation, Toledo, Ohio, a corporation of Ohio
Filed Apr. 29, 1963, Ser. No. 276,261
2 Claims. (Cl. 338—5)

This invention relates generally to measuring devices and more particularly to a method of manufacturing a load cell having prestressed strain gages and to the resulting article of manufacture to be used in the measuring devices.

The use of strain gages with spring elements in order to determine the amount of loading applied to the spring element is well-known. The practice has been to bond the strain gages, which are of an electrical wire type construction, directly to the spring element, and accordingly permit the gage to experience the same compression or elongation as the spring element. Further, in accordance with the change of length experienced by the spring element a proportional change in the electrical resistance of the strain gage will result. The resulting resistance change may then be translated in terms of the applied load or force. The output scheme usually employed is to place the strain gage, or gages, in a Wheatstone bridge circuit, and sense the change in the resistance values thereof by changes in the output of the said bridge.

All strain gages have compressive and tensile limits of response. If loads beyond these limits are applied to the spring elements, to which the strain gages are mounted, the accuracy of the resulting output of the strain gages is degraded. The extent of error due to a repeated operation of the measuring device beyond the safe upper limit of the strain gage is of considerable concern, for it has been found that the repeated application of the same overload will result in different output voltages. It has also been found that after repeated application of overloads that the output of a load cell will be susceptible to creep. Further, this lack of repeatability of strain gages is a serious limitation that has resulted in limiting their application. It is to overcome these and other prior art objections that this invention is directed.

Accordingly it is an object of this invention to provide a load cell arrangement which will be capable of repeated operations without any sacrifice of accuracy or linearity.

It is an object of this invention to provide a measuring apparatus which has a general correspondence in linearity and accuracy between the force receiving means and its associated transducer over the complete working range of the force receiving means without the necessity of operating beyond the safe upper limit of the transducer.

It is a further object of this invention to extend the range of repeatability of a load measuring device.

It is another object of this invention to provide a measuring apparatus which employs an elastic body and strain gage element which have correspondingly linear response curves over the working range of the elastic body and is of low cost, simple construction, and of high reliability and repeatability.

It is still another object to provide a method of manufacturing a measuring device which has substantially equally linear strain gage and load cell curves over the same working range.

According to the above, and first briefly described, the invention comprises a load cell having a load receiving surface and also having a predetermined working range within which it is accurately responsive to loads applied thereto. The load cell assumes different positions in response to the application of loads to the load receiving surface. There is also provided a strain gage which is linearly responsive in both directions from an unstressed position for a total working range which is substantially equal to that of said load cell. The strain gage is initially stressed in one direction, from its original dimension, to a value not to exceed its range of linear response, and is mounted to the load cell while said load cell is in its unloaded state. The strain gage is then capable of repeated linear response to forces applied to the load cell over a range equal to the entire working range of the strain gage and substantially equal to that of the load cell to which it is mounted. The measuring device will then be capable of accurately measuring the loading forces applied to the load cell from an initial unloaded condition over the entire linear range of the strain gage.

Other objects and many of the attendant advantages of this invention will be readily appreciated as the same becomes better understood by reference to the following detailed description, when considered in connection with the accompanying drawings in which like reference numerals designate like parts and wherein:

FIG. 1 illustrates a columnar type of load cell having a single prestressed strain gage applied thereto;

FIG. 2 illustrates the bridge type of output circuit utilized in this invention;

FIGS. 3–7 illustrate the columnar load cell and strain gage in various positions of stress, as labeled; and FIG. 8 is a flow diagram of the various steps leading to the production of a load cell having a prestressed strain gage for a transducer.

Now with reference to the details of the drawings illustrating one embodiment of the invention and beginning first with FIG. 1, there is shown a columnar type of spring element 11 whereon is mounted strain gage 12. It should, of course, be appreciated that this invention is capable of utilization with any of the many forms of spring elements presently being used, and this includes annular or ring type configurations. Also, any number of strain gages may be mounted upon the spring element.

As shown in FIG. 1, the columnar type spring element 11, is being subjected to a compressive load by container 13 and a load 15 therein. As is well appreciated the load which is applied to the elastic body 11, will result in the development of an internal stress, in the body to withstand the outside load. Also, in accordance with Hooke's law, it is appreciated that the strain developed in the elastic body, spring element 11, will be proportional to the stress to which the body is subjected by the applied load. Furthermore, spring element 11 will be deflected linearly for equal amounts of load applied thereto until it reaches its upper limit of response, thereafter the deflection of the spring element will no longer be linear for equal increments of load.

In order to measure the deflection developed by load cells 11 in response to the loads 13 and 15 being applied thereto at any particular time, it has been found expedient to bond onto the outer surface of the load cell a transducer of one type or another. The usual transducer has taken the form of a strain gage as shown by the numeral 12 in FIG. 1. The strain gage may be of the well-known resistance type and of conventional design as shown by the numeral 12, whereat is depicted a continuous length of wire 17 being laid out in hairpin fashion, back and forth, upon a rather flexible epoxy or bakelite backing 21. The wire 17 is secured to the backing by a suitable adhesive bonding agent, such as epoxy cement. Also as shown in FIG. 1, the ends of wire 17 are terminated on the backing 21 at points 18 and 19. Leads 20, which will be connected to a suitable A.-C. bridge measuring device, are then connected to points 18 and 19 in a manner shown in FIG. 1. Any conventional and commercially available type of strain gage can be used. The usual prior art procedure has been to bond an unstrained strain gage to the surface of the load cell, with the length of the wire of the gage being aligned in the desired direction of strain measurement, in a closely adhering relationship thereto. Accordingly any deflection which the load cell surface experiences will also be experienced in like amount by the strain gage. Therefore, if the surface is put into tension, the length of wire in the strain gage will increase and so will the resistance value thereof. Conversely, if the cell surface is compressed the wire length will decrease and accordingly its resistance value will be decreased.

The resistance value of commercially available strain gages usually vary between the ohmic limits of 70 and 350 ohms. In this example we shall employ a constantan type strain gage which has an initial value of approximately 120 ohms. Knowing the initial resistance value of a strain gage, it is possible to determine the value of resistance at the limits of its working range for any given strain gage. For example, with a gage factor of 2 and a strain, $\Delta L/L$, of 1000 microinches per inch one can find, by applying the formula, $$GF = \frac{\Delta R/R}{\Delta L/L}$$

that $\Delta R$ will be about .24 ohm. Accordingly, it follows that the resistance value at the lower limit of linearity of the strain gage is equal to 119.76 ohms and at its upper limit of linearity it is equal to 120.24 ohms. This information is necessary in balancing the bridge circuit of FIG. 2 in which strain gage 12 will form one arm thereof.

Furthermore, in the prior art load cell devices wherein the unstressed strain gages are cemented to a spring element, it has been found that if loads in excess of the strain gage's limit of strain are applied to the spring element that the accuracy, linearity, and reliability of the system is suspect. Specifically, it has been found that if a given overload is successively weighed that the output reading of the load cell will not repeat or agree. It has also been found that if a load cell is repeatedly subjected to loads above the upper limit of stress of its associated strain gage that the output may thereafter be subject to creep. This of course is not desirable and in order to overcome this shortcoming various schemes, including limiting the use of the load cell to the upper limit of stress of the strain gage, have been tried.

The unreliability of load cells when subjected to loads above the upper limit of stress of its associated strain gage has been attributed to various factors. For example, the unreliability has been attributed to the fact that not only is the strain gage being stressed beyond its upper limit of stress, but the bonding cement is also being subjected to similar stresses. Accordingly, it has been found that the contact between the spring element and the strain gage may be ruptured or affected by overloading, and the result is overall unreliability or unrepeatability of load cells.

One reason why the prior art measuring devices have found it necessary to operate the strain gages beyond the safe limits thereof beyond its limit of tensile or compressive accuracy, is because of the fact that the working range of a strain gage, which extends to limits of tensile and compressive response from a neutral position, is not enough to facilitate the range of tensile or compressive loads to which the spring element may be subjected. Furthermore, it can be appreciated that if a measuring device is to be subjected to only tensile loads that its compressive range will be wasted. However, if the strain gage could be mounted to the spring element, so that it was initially in its limit of compressive responsive, then the strain gage would be able to respond to tensile loads over its entire working range, and there would be no need to operate the gage into its plastic region. Limiting the range of operation of the strain gage to its working range will not only free the wire thereof from over fatigue, but will also relieve its bonding cement from being overstressed and accordingly the strain gage will be kept in close contact with the spring element to thereby reflect any changes therein. Of course, the same principle could be applied to extend the range of strain gages to compressive loads.

A further reason why prior art measuring devices have found it necessary to operate a strain gage transducer beyond its safe working limits is because, as explained above the change in resistance of a strain gage from no load to its upper tensile limit is only .24 ohm. The change of .24 ohm is then subdivided into, let us say, 1000 increments by the readout instrumentation in order to give a reasonably accurate indication of the load which has produced the resulting change in resistance. It is also important to keep the load reading by the output instrumentation within the required 0.1% accuracy of readability. Therefore, it can be appreciated that if means were devised to increase the resistance change of a strain gage from a no load condition to its upper tensile or compressive limit that the accuracy of the output can be greatly increased. Accordingly, by prestressing a strain gage to its tensile or compressive limit and then operating the load cell to measure respectively compressive or tensile loads, I am able to operate the strain gage over a change of resistance equal to .48 ohm. Also, by using, along with a prestressed strain gage, a load cell which has twice the deflection rate as a previous cell I can now obtain twice the output for a given load as that which was obtainable from the previous arrangement. It is also obvious, that the accuracy of such an arrangement will be greatly increased.

Therefore, to meet and overcome the deficiencies in linearity, accuracy and repeatability in the prior art load cells I have provided a unique and novel method, as well as a novel measuring device, of mounting the strain gage in a stressed condition to a spring element which is in an unloaded initial condition. For example, let us assume that a strain gage has been prestressed to its tensile limit of stress and is then bonded to an unstressed spring element. Accordingly, the load cell will now be able to facilitate up to twice as much compressive load as it would have if the strain gage was mounted upon the spring element in its unstressed state. That the above results are true is evident from the fact that application of a compressive load equal to the original compressive limit of stress of the strain gage to the spring element will merely bring the strain gage to its original unstressed condition. It is then possible to apply further loading to the load cell up to the upper limit of the compressible limit of stress of the strain gage and still remain within the limits of stress of the spring element. Accordingly up to twice the original compressive limit of stress can now be applied to the load cell. Of course, if the strain gage had been prestressed to its upper limit of compressibility and then mounted to the spring element the load cell would then be capable of experiencing up to twice the tensile load and still remain within the strain gage's limit of tensile response.

It should, of course, also be appreciated that not only will the range of the strain gage be effectively doubled by the procedure outlined above, but also that the bonding cement will also be able to operate within its safe limits of stress without rupturing the connection between the strain gage and the spring element.

In order for the reader to have a better appreciation of the novel results obtained from the resulting unique measuring system, the method of constructing the unique apparatus will now be outlined. The steps necessary in carrying out the method are shown in flow diagram form at FIG. 8.

Initially it is necessary to prepare the surface of the load cell which is to carry the strain gage by cleaning off any undesirable oils, films or dirt by washing with a suitable solvent. The cleaned surface is then coated with a suitable bonding agent such as epoxy cement. This bonding agent is of the same type which coats filament 17 and holds it in place on backing 21. The physical relationship of unloaded spring element 11 and an unstressed strain gage 12 is shown in FIG. 3.

The next step in the method is to prestress spring element 11, which in this case is of columnar configuration but which may take any desired shape, to a predetermined value. The amount of prestressing is of course variable in accordance with the desired results. For example, if it is intended that the system be used as a weight measuring device, which would probably mean that the column would be compressed in proportion to the weight applied, and if it is further desired that none of the available working range of the strain gage which reacts to compressive load be wasted by the system tare, then the amount of system tare would provide the desired figure of prestrain to which the column is to be subjected. Specifically, in systems which are going to utilize the same amount of tare for repetitive weighings, such as container 13 in FIG. 1 to give only one example, it is a simple matter to accurately determine this figure in advance. It is then desired, and necessary for accurate determination of the load, that this amount of tare be subtracted from the final figure.

Accordingly if it is desired to compensate for the system tare so that the strain gage's response to compressive loads will be indicative only of the actual or live load it follows that the system tare amount is the figure to which the load cell will originally be loaded. This preloading can be done by any loading means, for example, it is possible to merely place a weight equal to the system tare upon the load receiving terminal of load cell 11, see FIG. 4. This will, of course, compress load cell 11 to an amount equal to the system tare. While in this loaded condition, and if the bonding agent has not as yet been applied to the load cell this should now be done, the strain gage 12 is then placed upon the treated surface of the load cell. Means such as a strap 24 are then applied to hold the strain gage against the bonded surface of load cell 11 until the bonding process takes effect.

The strain gage 12 is in an unstressed state when it is strapped to the preloaded load cell 11. While either the filament 17 or the backing 21 may be positioned upon the spring element surface, in practice it has been found to be desirable to place the filament thereupon. Also, as shown in FIG. 1, the loops of wire 17 have been placed parallel to the longitudinal dimension of load cell 11. This is desirable since best results are obtained if the length of filament 17 is actually aligned in a direction of desired strain measurement.

The next step in carrying out the method is to cure the load cell while in its loaded position. The curing step is done while the strain gage is being firmly held to the surface of load cell 11, and also while the load cell is in its preloaded stage, by subjecting the load cell to heat for an extended period of time. The length of time and temperature of the oven into which the load cell is placed will vary with the materials used, for example where the bonding agent used was epoxy cement it was found necessary to subject the load cell to a temperature of 250° F. for three hours. However all that need be said is that this step be carried out for as long as is necessary in order to firmly bond the strain gage to the load cell surface. The strain gage should be so firmly bonded to the load cell surface so that each infinitesimal portion of filament 17 is strained identically with the load cell surface without any detectable creepage even though subjected to repeated applications of stress in either tension or compression. Accordingly filament 17 is contiguously held to the outer surface of load cell 11 by this bonding and baking process.

After the loaded cell has been subjected to the curing process for the necessary length of time it is allowed to cool off. The strap 24 and loading may then be removed. As is brought out in FIG. 5 labeled, "Unloaded Cell-Pretensilely Stressed Strain Gage" upon the removal of the loading force, and in this case assumed to be equal to the system tare, the load cell 11 will assume its original dimensions. However since the strain gage is firmly bonded to the load cell it will necessarily be lengthened, see FIG. 5. Accordingly, when the spring element 11 is in an unloaded state the strain gage 12 will be in a prestressed state by an amount indicative of the original loading to which the cell 11 was subjected. Specifically in this case, since the load cell was subjected to an original compressive force equal to the system tare, strain gage 12 will be under a tensile stressing equal to the system tare.

Accordingly, upon the application of a compressive load along with the system tare to a load cell having a strain gage tensively prestressed to the system tare only the active load will be registered. This result is achieved through the use of the novel mounting of a prestressed strain gage along with adjustment of the bridge circuit of FIG. 2 to be balanced in an output voltage ($E_0$) indicating amount if a value of resistance equal to the resistance of the strain gage in an unstrained or neutral position is contained in the arm labeled 12. As shown in FIG. 2 the bridge circuit is a basic A.-C. bridge circuit of conventional design and accordingly further explanation thereof is deemed unnecessary, however for a more detailed explanation reference is made to page 229 of Theory and Application of Industrial Electronics by John M. Cage, published by McGraw-Hill Book Company, Inc., 1951.

Therefore, as the system tare, container 13 of FIG. 1 is applied to the load cell 11 the output voltage $E_0$ of bridge 30 will be returned to its initial reference value, from which it was varied by an amount equal to the prestressing of strain gage 12. This loading, of course, also returns the load cell to a condition of stress equal to the amount of initial preloading, see FIGS. 4 and 6. Thereafter strain gage 12 will respond to the compressive load to result in a change in the value of resistance of strain gage 12, and accordingly change the output voltage $E_0$, in proportion to the amount of active load. Accordingly, the strain gages response range from its neutral or unstressed initial value up to its compressive limit can be wholly devoted to registering the amount of active load and not be partially used up in registering the amount of system tare or dead weight, see FIG. 7 for an indication of a fully loaded measuring device.

At this point in order to give the reader a better appreciation of the scope of novelty of this invention it is appropriate to dwell awhile on the variations of results which are available by prestressing the strain gage to various amounts.

Instead of prestressing the strain gage to a predetermined value equal to the system tare it is possible to stress the gage to its tensile limit, or alternatively to its compressive limit. This of course is done by prestressing the load cell to the desired amount by a preloading thereof with a proper weight and then bonding the unstressed cell thereon. Therefore, upon the unloading of the cell, after the baking operation, the measuring device will assume its normal position whereas the strain gage and the epoxy cement will be prestressed to the desired degree.

Let us assume that a measuring device is thus obtained which comprises a load cell 11 having a strain gage 12 bonded thereto, and that the gage will be initially prestressed to its tensile limit when spring element 11 is in its unloaded state. Also in this case, as in the example outlined above, strain gage 12 will again form the arm labeled $R_{12}$ in the A.-C. bridge circuit of FIG. 2. However, whereas in the system tare example the bridge was balanced to yield a base or initial output voltage $E_0$ for a resistance value of $R_{12}$ equal to the unstrained or neutral resistance of strain gage 12, in this case the bridge shall be balanced to yield a base voltage of initial value $E_0$ for a resistance value of $R_{12}$ equal to a value of resistance of strain gage 12 when it is in its tensile limit, 120.24 ohms.

It should of course be understood that since the gage and epoxy cement are already in their upper tensile limit with no load applied to the load cell 11 that any amount of tensile load applied to the system will immediately be in the non-linear range of the strain gage. However, a greatly extended range of compressive loads may now be applied to the spring element 11 before they exceed the upper compressive limits of strain gage 12 and the epoxy cement. That this is true can be readily appreciated if it will be recalled that the initial range in response to compressive loads of the strain gage 12 was from its neutral or unstressed condition to its compressive linear limit, however by prestressing the gage to its tensile limit the gage can now receive compressive loads over the entire range of the strain gage, from its tensile limit to its compressive limit, and accordingly its range of response to compressive loads is doubled over conventional usage. This prestressing arrangement results in a strain gage which has a range of linear response that is substantially coextensive with the linear range of the load cell and accordingly the importance of complicated calibrating schemes or limiting use of the load cell to loads within the linear range of the strain gage are greatly reduced.

As an alternative it is of course possible to prestress the strain gage to its upper compressive limit and thereby achieve a measuring device which will accommodate and repeatedly respond to tensile loads over substantially the entire working range of the load cell.

After the load cell is removed from the oven with its strain gage firmly bonded thereto and the preloading weight removed the only step which remains to complete the finished article of manufacture is the final dressing up of the measuring device. This may include the removal of any excessive bonding agent from the load cell. It would also include the soldering of leads 20 to the strain gage terminals 18 and 19. Leads 20 are then placed in circuit with the A.-C. bridge 30 of FIG. 2 to form resistance $R_{12}$ thereat.

Whereas the hereinabove description has been devoted to outlining a method whereby a spring element 11 is preloaded to an amount equal to the desired amount of prestrain which its associated strain gage is to initially have when the load cell is in its unloaded state, and then bonding an unstrained gage thereto with the desired amount of prestrain thereby resulting in the gage upon the unloading of the load cell; the same resulting measuring device is obtainable by a different mode of construction. In particular, the wiring jig which is initially used to construct the strain gage in its serpentine configuration may be provided with suitable wire tensioning or compressing means so as to result in a strain gage which is already prestressed to the degree of compression or tension desired. The preloading of the load cell is then unnecessary, for all that need be done is to bond the prestressed strain gage to an unloaded cell.

It should, of course, be understood that the foregoing disclosure relates to only a preferred embodiment and method of manufacturing the invention, and that numerous modifications or alterations may be made in structure or steps without departing from the spirit and the scope of the invention.

I claim:

1. In a measuring device, a load cell comprising, in combination, spring element means, and a metallic strain gage linearly responsive to compressive and tensile limits from an unstressed position, said strain gage arranged substantially in a single plane and bonded to a surface of the spring element means, the strain gage being prestressed to a value on one side of said unstressed position below one of the respective limits and the spring element means, in operation, straining the strain gage from said prestressed value through zero stress value to a stressed value on the other side of said unstressed position below the other one of the respective limits, whereby the range of the strain gage is extended.

2. In a measuring device, a load cell comprising, in combination, spring element means having a linear working range extending either side of an unloaded position, and a metallic strain gage having a linear working range which is less than the working range of the spring element means extending either side of an unstressed position, said strain gage arranged substantially in a single plane and bonded to a surface of the spring element means, the strain gage being prestressed to a value on one side of said unstressed position within its working range and the spring element means, in operation, straining the strain gage from said prestressed value through zero stress value to a stressed value on the other side of said unstressed position within its working range, whereby the range of the strain gage is extended.

References Cited by the Examiner

UNITED STATES PATENTS

| | | | |
|---|---|---|---|
| 2,467,752 | 4/1949 | Howe | 338—5 |
| 2,493,029 | 1/1950 | Ramberg | 338—5 |
| 2,550,588 | 4/1951 | Oberholtzer | 73—141 |
| 2,920,880 | 1/1960 | Laycock | 177—211 |
| 2,955,811 | 10/1960 | Jonas et al. | 177—211 X |
| 2,979,807 | 4/1961 | Harrison | 338—2 X |
| 2,991,542 | 7/1961 | Edwards | 338—2 X |
| 3,084,300 | 4/1963 | Sanchez | 73—88.5 X |

LEO SMILOW, *Primary Examiner.*